United States Patent [19]

Romeas

[11] 4,095,254
[45] June 13, 1978

[54] TRANSCODER FOR COLOR TELEVISION SIGNALS

[75] Inventor: René Romeas, Paris, France

[73] Assignee: Thomson-Brandt, Paris, France

[21] Appl. No.: 731,938

[22] Filed: Oct. 13, 1976

[30] Foreign Application Priority Data

Oct. 17, 1975  France .................. 75 31902

[51] Int. Cl.² .............................................. H04N 9/42
[52] U.S. Cl. ........................................ 358/11; 358/14
[58] Field of Search ............................ 358/11, 14, 43

[56] References Cited
U.S. PATENT DOCUMENTS 3,787,614  1/1974  Waldspurger .......................... 358/43

OTHER PUBLICATIONS

Steele, "The Transcoding of Colour Television Signals", Television Society Journal; vol. 11, No. 2, 1965, pp. 28–33.

Primary Examiner—Richard Murray
Attorney, Agent, or Firm—Cushman, Darby & Cushman

[57] ABSTRACT

The invention relates to devices for obtaining color television signals conforming to one given standard from color television signals conforming to another given standard. The invention consists in using a single balanced modulator which is associated with a delay line, this modulator being fed by an alternating sequence of two sub-carriers in quadrature.

13 Claims, 6 Drawing Figures

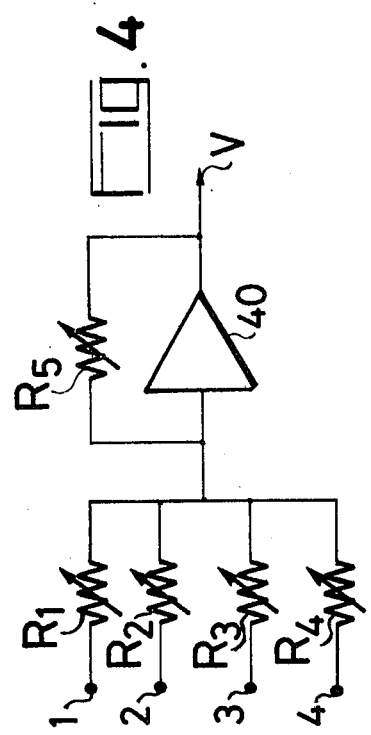
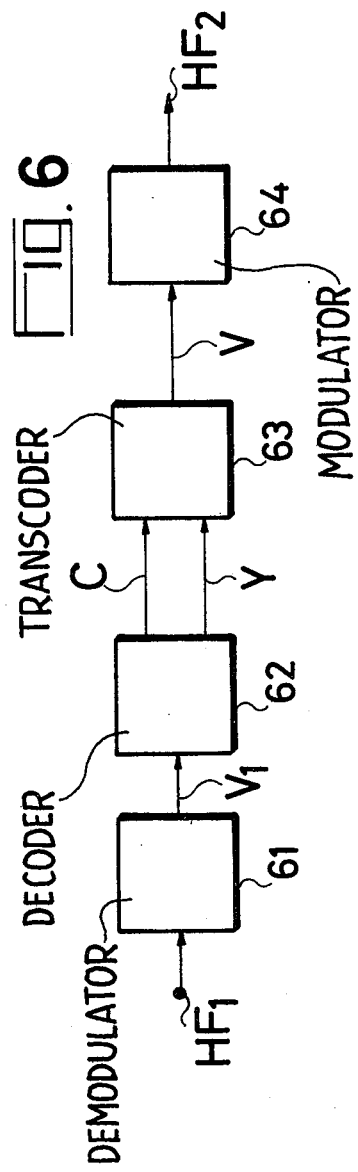

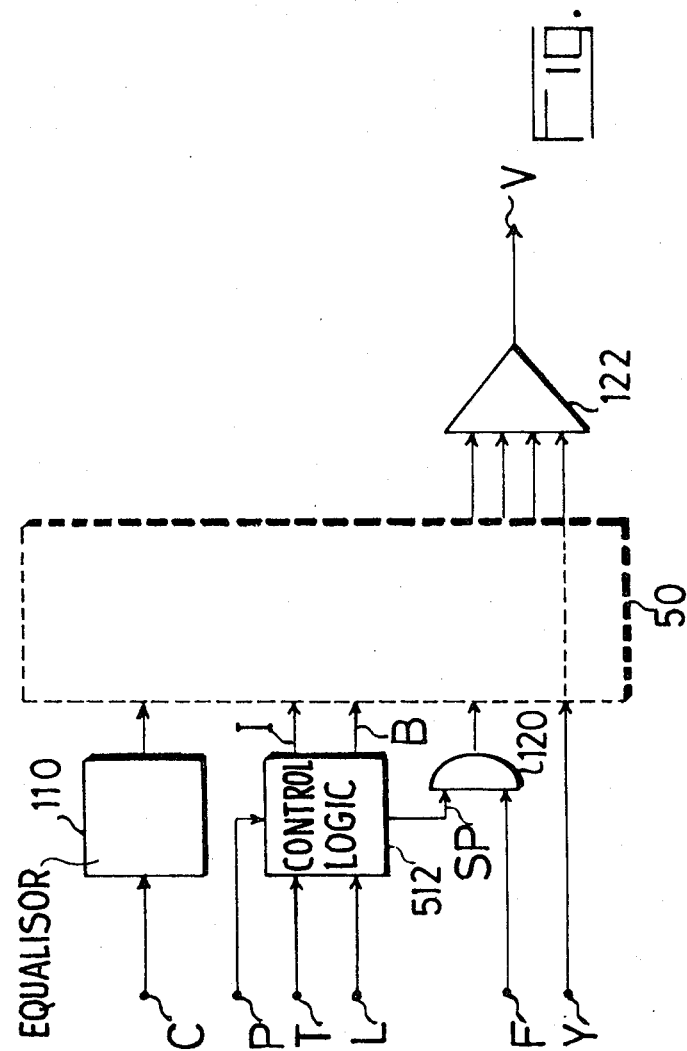

TRANSCODER FOR COLOR TELEVISION SIGNALS

This invention relates to transcoders for colour television signals by which it is possible in particular to obtain from a composite video signal conforming to a sequential standard, such as for example the SECAM standard, a composite video signal conforming to a simultaneous standard, such as for example the NTSC standard. In the context of the present invention, the meaning of the term "standard" shall be restricted to the characteristics concerning the service signals and the coding of chrominance signals, and the scanning characteristics shall be referred to as "raster".

It is known to construct dual standard television receivers capable of receiving transmissions corresponding to the SECAM or PAL standards, and it is known that the PAL standard has numerous points in common with the NTSC standard, in particular regarding the type of modulation of the chrominance sub-carrier. French Pat. No. 72.16 273 describes a dual standard receiver of this type obtained by modifying a PAL receiver in such a way that signals of the SECAM type are partly transcoded in this receiver into signals of the PAL type. This transcoding is far from being complete and, in particular, the signal intended to be demodulated in the PAL circuits does not comprise the reference bursts which form part of normal PAL signal and which also exist in the NTSC signal.

In accordance with the present invention it is provided a colour television transcoder for transcoding an input signal comprising a first sequence of a first and a second chrominance signals having a fixed common duration and alternating at a line frequency, into an output signal comprising a subcarrier modulated by simultaneously said two chrominance signals, said transcoder comprising:

generation means for generating a second sequence of a first and a second sub-carriers alternating synchronously with said first sequence; said first and second sub-carriers having a same sub-carrier frequency and the second sub-carrier being in quadrature with the first sub-carrier;

a single balanced modulator receiving said first and second sequence for modulating respectively said first and second sub-carriers with said first and second chrominance signals, delivering a modulated signal;

means for delaying said modulated signal by said duration, delivering a delayed signal;

adding means for adding said modulated signal and said delayed signal, delivering said output signal; and control means receiving said first sequence and a set of external synchronisation signal, connected to said generation means, for controlling the alternance of said first and second sub-carriers.

For a better understanding of the invention, and to show how the same may be carried into effect, reference will be made to the ensuing description and to the attached figures among which:

FIG. 4 illustrates one embodiment of the component 122 of the transcoder shown in FIG. 1.

FIG. 5 illustrates a simplified block diagram of a variant of the transcoder illustrated in FIG. 1.

FIG. 6 illustrates a block diagram of a transcoding system.

The notations which will be used in the course of this description are common in the technical field of colour television and the symbols quoted will be quoted purely by way of illustration and, in most cases, with reference to the various standards in use, in particular the SECAM and NTSC standards.

It is known that, in any conventional colour television system, the luminance signals E'y and the chrominance signals $E'_R$, $E'_v$ and $E'_B$ have to satisfy the following relation:

$$E'y = 0.30 \, E'_R + 0.59 \, E'_v + 0.11 \, E'_B.$$

Accordingly, it is possible to transmit only the signal E'y and two of the three chrominance signals, i.e. generally $E'_B$ and $E'_R$.

Under the SECAM standard, so-called colour difference signals defined by the following relations are transmitted alternately at the line frequency:

$$D'_B = 1.5 \, (E'_B - E'_y)$$

$$D'_R = 1.9 \, (E'_R - E'_y)$$

These signals are pre-accentuated and occupy a frequency band ranging from 0 to approximately 1.4 MHz.

Under the NTSC standard, signals denoted $E'_Q$ and $E'_I$ defined by the following relations are simultaneously transmitted:

$$E'_Q = 0.41 \, (E'_B - E'_y) + 0.48 \, (E'_R - E'_y)$$
$$E'_I = -0.27 \, (E'_B - E'_y) + 0.74 \, (E'_R - E'_y)$$

These signals are not pre-accentuated and occupy frequency bands ranging from 0 to approximately 600 kHz for $E'_Q$ and from 0 to approximately 1.3 MHz for $E'_I$.

In order to be able to transmit them simultaneously, two carriers of the same frequency, but in quadrature, are amplitude-modulated by these signals with suppression of the carrier; in addition, the carrier corresponding to $E'_I$ is modulated with asymmetrical side bands so that it does not have any high frequencies above those of the carrier corresponding to $E'_Q$.

A composite video signal $E'_M$ is then obtained by adding the luminance signal and these two modulated carriers:

$$E'M = E'_y + E'_Q \sin(\omega t + 33°) + E'_I \cos(\omega t + 33°)$$

If the chrominance signals with a frequency higher than 600 kHz are suppressed so as to obtain synmmetrical side band modulation of the carrier corresponding to $E'_I$, a change of axes can be made to express the signal $E'_M$ as a function of the signals $(E'_B - E'_y)$ and $(E'_R - E'_y)$:

$$E'_M = E'_y + 0.878 \, [0.562 \, (E'_B - E'_y) \sin \omega t + (E'_R - E'_y) \cos \omega t].$$

This truncation of the band-width of the chrominance signals is frequently used in commercial television receivers where it provides for considerable simplification of the circuits, despite which it has been found to allow satisfactory reproduction of the colours.

The composite video signal according to the NTSC standard also comprises a burst of pure sub-carrier with the form sin($\omega t$ + 180°) situated on the rear line suppression plateau. This burst enables the receivers to be supplied with a phase reference for the demodulation of the chrominance signals.

Figure 1:
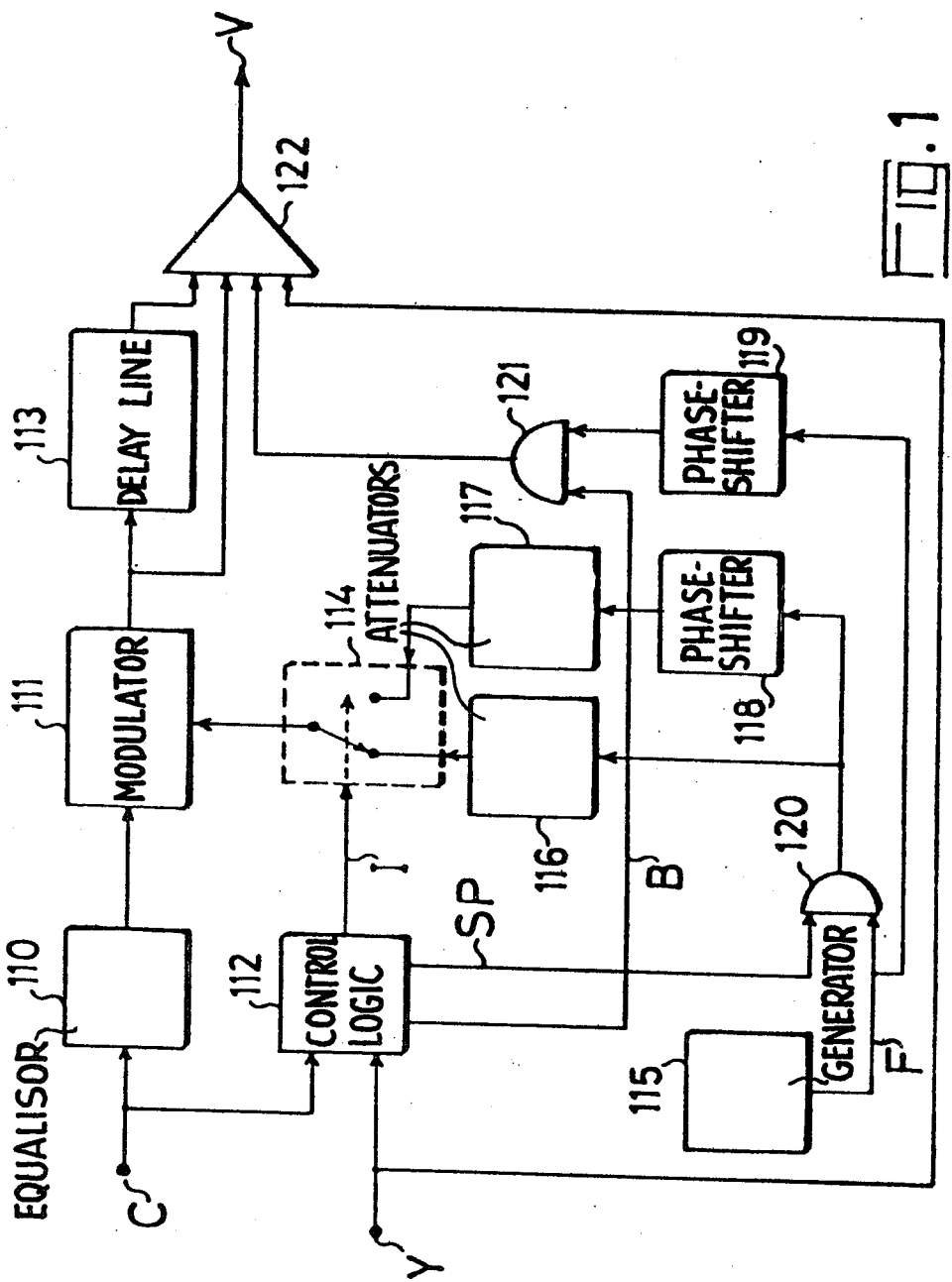
FIG. 1 illustrates a block diagram of a transcoder according to the invention.

FIG. 1 illustrates a block diagram of a transcoder according to the invention for colour television signals which enables a composite video signal V conforming to the NTSC standard to be obtained from a luminance video signal Y, comprising in the usual way the frame and line synchronisation pulses, and from an alternating chrominance signal C conforming to the SECAM standard. The transcoder thus described is limited to the case where these signals all conform to a common scanning standard both in regard to the frame frequency and in regard to the line frequency. Although television transmissions under the SECAM standards are currently made in accordance with a raster of 25 images of 625 lines per second, whilst transmissions under NTSC standards are made in accordance with a raster of 30 images of 525 lines per second, a transcoder of the type in question is nevertheless useful because it is of considerable advantage, for recording colour television signals, to use a coding of the chrominance signals of the SECAM type because it enables a very good tolerance to variations in the instantaneous speed of the recording supports to be obtained. It is thus advisable, in particular for making a television broadcasts in the USA, to transcode to the NTSC standards the chrominance signals read on a recording of the type in question.

The transcoder according to the invention comprises an equalising circuit 110, a modulator 111, a control logic 112, a delay line 113, a switch 114, a sub-carrier generator 115, two attenuators 116 and 117, a fixed phase shifter 118, a variable phase shifter 119, two analog gates 120 and 121 and a summator 122.

The alternating signal C is composed of two chrominance signals $D'_B$ and $D'_R$ which, in this case, conform to the SECAM standards. They are applied to the equalising circuit 110 in which they are de-accentuated, for example by a conventional circuit of the R-C type, and then filtered by a low-pass filter which cuts off at 600 kHz. Finally, this operation consists in bringing the amplitude/frequency curve of these signals to the contour of that of the signal Q of the NTSC standard.

The signal C is also applied to the control logic 112 which in this signal locates the colour identification signals present at the beginning of the frame. This control logic also receives the luminance signal Y in which it locates the frame and line synchronisation signals. From these various signals, the logic circuit formulates the control signals of the transcoder.

The signal equalised in the circuit 110 is applied to the modulator 111 which is a conventional balanced amplitude modulator. It also receives the sub-carrier to be modulated supplied by the switch 114.

This switch which is illustrated diagrammatically in the drawing but is formed for example by transistors, is controlled by the logic circuit 112 and switches at the line frequency so as to apply to the modulator 111 a sub-carrier of adequate amplitude and phase. To obtain a modulation of the NTSC type, the sub-carrier modulated by the signal $E'_R - E'_y$ has to be phase-shifted by + 90° relative to that modulated by the signal $E'_B - E'_y$. On the other hand, the signals emanating from the circuit 110 have a relative amplitude conforming to the SECAM standard (coefficient 1.5 for $E'_B - E'_y$ and − 1.9 for $E'_R - E'_y$), and this relative amplitude has to be brought up to that of the NTSC standard (coefficients 0.525 and 1) to take into account the relative amplitude of the modulated carrier relative to the luminance (coefficient 0.878). To this end, the process starts with a sub-carrier supplied by the oscillator 115 which is stable in frequency and phase. This sub-carrier passes through the analog gate 120 which, controlled by the logic circuit 112, interrupts it during the instants where the video signal has to be free from a sub-carrier, in particular during the synchronisation signals. This gate is not indispensable because the modulator 111 is of the balanced type, although it does enable inter alia any faults in this modulator to be reduced and the SECAM identification bursts to be eliminated. The fixed phase shifter 118 receives the sub-carrier coming from the gate 120 and phase-shifts it through − 90°, the sign of this phase shift thus being selected to cancel the −sign of the coefficient − 1.9 of the signal ($E'_R - E'_y$) and ultimately to obtain a modulated sub-carrier phase-shifted through + 90°. The attenuator 116 receives the sub-carrier coming from the gate 120 and attenuates it by a coefficient $y \times (0.562/1.5)$. The attenuator 117 receives the sub-carrier phase-shifted by the phase shifter 118 and attenuates it by a coefficient $y \times (1/1.9)$. The signals issuing from these attenuators are then applied to the inputs of the switch 114. Since the modulation operation is linear in relation to the amplitude both of the modulated signal and of the modulator signal, the relative amplitude of the modulated sub-carriers issuing from the modulator 111 is thus that of the NTSC standards. The coefficient $y$ which is common to the two attenuators 116 and 117 is thus selected for the amplitude of the sub-carrier modulated by $E'_R - E'_y$ to be 0.878 times that of the luminance Y, taking into account the gain of the other elements in the chain.

It is pointed out that, since it is a question of regulating the relative levels of the equalised signal in relation to the sub-carriers, it would be equally possible to arrange the attenuators between the equaliser 110 and the modulator 111. In that case, however, it would be necessary to provide an additional switch because, in any event, it is advisable to switch the sub-carrier feed to the modulator 111 on account of the phase shift of 90°. Accordingly, the solution described is that which minimises the number of switches.

The modulated signal issuing from the modulator 111 is applied on the one hand directly to the summator 122 and on the other hand to a delay line 113 which delays it by the exact duration of an analysis line of the image. The delay line thus represented comprises amplification means which enable the insertion loss to be eliminated. The retarded modulated signal thus obtained is applied to the summator 122.

In this way, the sum of a sub-carrier modulated by the signal $E'_B - E'_y$ and of a sub-carrier of the same frequency, but in quadrature, modulated by the signal $E'_R - E'_y$, these modulations conforming to the NTSC standard, is permanently obtained. Accordingly, the signal arising out of this summation may be described, in accordance with another well known representation, as a carrier phase-modulated by the chromaticity value transmitted and amplitude-modulated by the saturation value of this chromaticity.

In order to obtain the complete composite video signal V, this sub-carrier thus modulated, the luminance signal Y and the reference bursts are added in the summator 122.

These bursts are obtained from the sub-carrier supplied by the generator 115. This sub-carrier is phase-shifted by the variable phase shifter 119 in such a way that it is in phase-opposition to the sub-carrier modulated by the signal $E'_B - E_y$. This phase shifter is variable in such a way as to compensate for the phase shifts which could occur in particular in the attenuators 116 and 117 and in the modulator 111. The amplitude of these bursts is calibrated by the phase shifter 119 of which the insertion loss is utilised.

In addition, the exact amplitude of the bursts is defined within relatively wide limits by the NTSC standard, which imposes few additional restraints upon the design of this phase-shifter. The sub-carrier thus phase-shifted and amplitude-calibrated is applied to the analog gate 121. This gate is opened by the logic circuit 112 for the duration of the bursts during a fraction of the rear line suppression plateau. The bursts emanating from this gate 121 are then applied to the summator 122.

Figure 2:
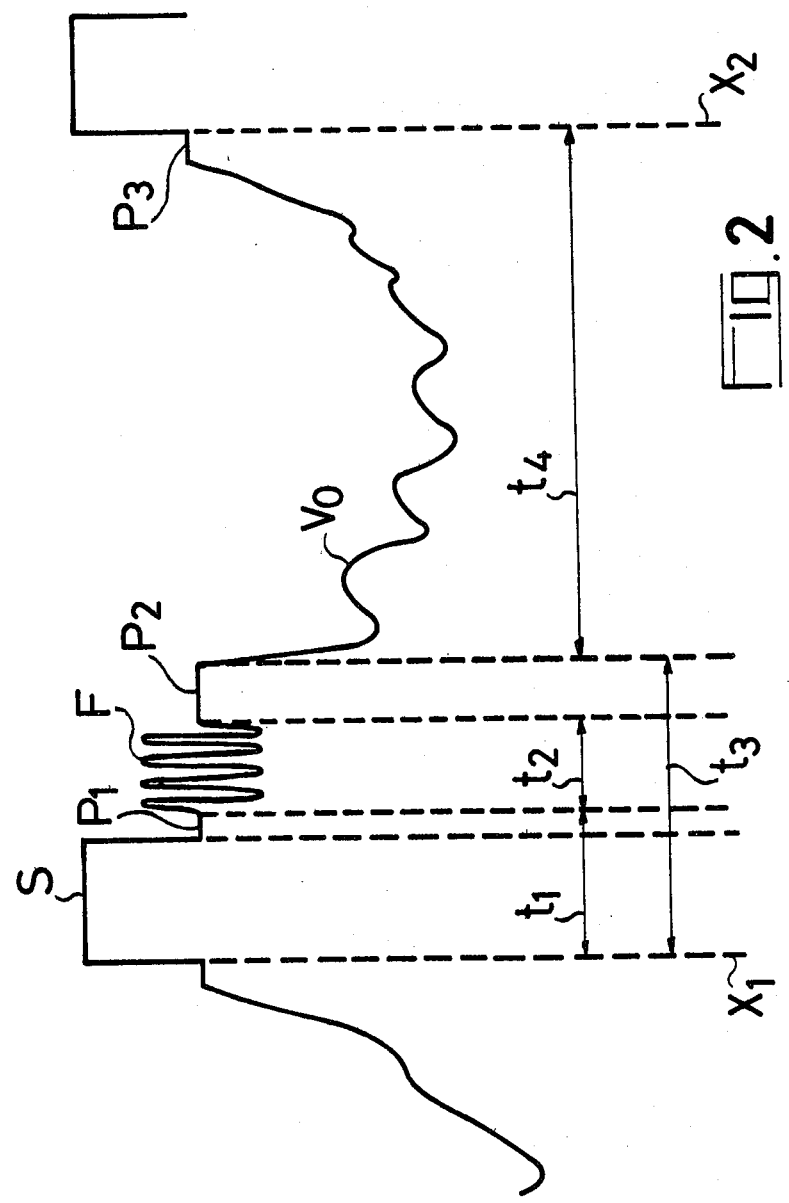
FIG. 2 illustrates part of a composite video signal.

FIG. 2 shows a fragment of a composite video signal according to the NTSC standard. The time scale has not been observed and the part comprised between the dotted lines $X_1$ and $X_2$ corresponds to an analysis line of the image.

This line begins with a synchronisation pulse S followed by a rear suppression plateau comprising the regions $P_1$ and $P_2$ surrounding a burst of sub-carrier F. Then comes the video signal VO comprising the luminance and chrominance information, followed by a front suppression plateau $P_3$ which finishes the line. Taking the time origin at the front edge of the pulse S, the region $P_1$ terminates after a time $t_1$, the burst F lasts for a time $t_2$, the region $P_2$ terminates after a time $t_3$ and the signal V lasts for a time $t_4$.

Figure 3:
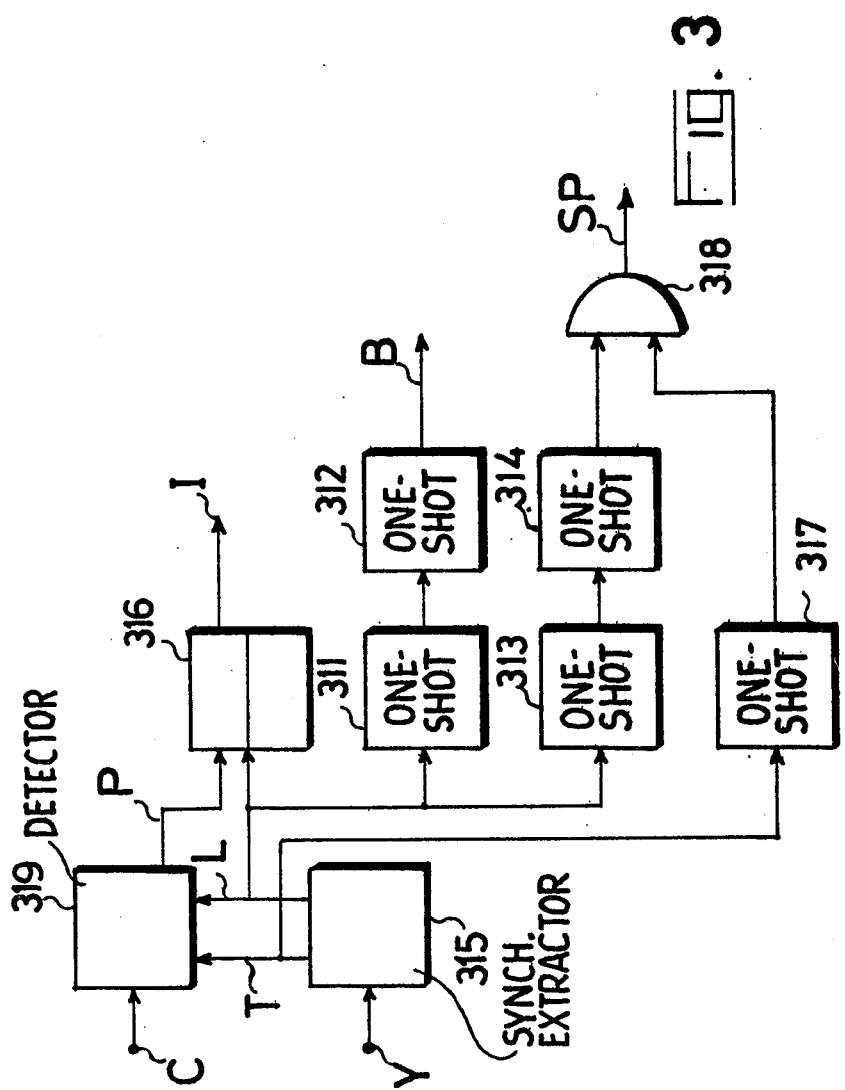
FIG. 3 illustrates one embodiment of the component 112 of the transcoder shown in FIG. 1.

FIG. 3 shows one embodiment of the logic control circuit 112 comprising an identification signal detector 319, a synchronisation signal extractor 315, a bistable circuit 316, five monostable circuits 317 and 311 to 314 and a gate 318.

The synchronisation signal extractor 315 is an element which produces frame and line synchronisation signals T and L, respectively, from the luminance signal Y. In this example, the leading edge of the signal L coincides with the leading edge of the line synchronisation pulse denoted by the line $X_1$ in FIG. 2.

The identification signal detector 319 produces from the chrominance signal C a phase-reset signal P which is, for example, a pulse corresponding to the detection of the colour identification signal $D'_R$ on one of the lines reserved for this purpose at the beginning of the field. This detector uses the synchronisation signals T and L for its operation.

The extractor 315 and the detector 319 are conventional elements used in particular in commercial television receivers.

The bistable circuit 316 receives the line synchronisation signal L at its clock input. Accordingly, it switches at the line frequency and thus supplies the control signal I to the switch 114. To ensure that the phase of this signal is correct for the switch 114 to dispatch towards the modulator 111 the adequate sub-carrier corresponding to the chrominance signal arriving at this same moment at the modulator, this bistable circuit receives at one of its preselection inputs the phase-reset signal P which, in the event of phase inversion of the signal I, causes it to switch one more time.

The monostable circuit (one shot) 311 receives the signal L and is thus triggered by the leading edge of the line synchronisation pulses. It transmits a pulse of duration $t_1$ of which the rear edge triggers the monostable circuit 312. The monostable circuit 312 transmits a signal B of duration $t_2$ which controls the opening of the burst gate 121.

In the same way, the monostable circuit 313 is triggered by the signal L and, after a time $t_3$, triggers the monostable circuit 314 which transmits a signal of duration $t_4$. The monostable circuit 317 is triggered by the signal T and transmits a signal of which the duration is sufficient for it to disappear only after the end of the colour identification signals situated in the frame suppression interval. This signal closes the gate 318 which transmits the signal SP, thus preventing the signal transmitted by the monostable circuit 314 from reaching the gate 120. Thus, the colour identification signals are not incorporated in the NTSC modulation.

Although the various elements of the arrangement shown in FIG. 1 are designed for the various components of the signal V arriving at the summator 122 to have substantially correct relative levels, it is desirable to have means which enable these levels to be regulated in the best possible manner. FIG. 4 shows one embodiment of this summator which provides for such regulation.

To this end, an amplifier 40 is connected as an operational amplifier equipped with a summation scale comprising at its input four variable resistors $R_1$ to $R_4$ and, between its output and its input, a variable negative feedback resistor $R_5$. The modulated sub-carrier emanating from the modulator 111 arrives directly at the input 2 of the resistor $R_2$ and, by way of the delay line 113, at the input 1 of the resistor $R_1$. the sub-carrier bursts arrive at the input 3 of the resistor $R_3$ and the luminance signal Y arrives at the input 4 of the resistor $R_4$. It is thus possible to regulate the relative level of each of these signals by regulating each of the resistors $R_1$ to $R_4$. The level of the composite signal V issuing from the amplifier 40 may be globally regulated by regulating the negative feedback resistor $R_5$.

The arrangement shown in FIG. 1 is only one particular embodiment of the invention and other embodiments may be imagined. For example, it often happens that signals P, T, L and F such as defined above are already available at the output of preceding apparatus. In that case, the arrangement according to the invention may be constructed in accordance with the particular embodiment shown in simplified form in FIG. 5.

In this particular embodiment, the alternating chrominance signal C only ends at the equalising circuit 110. The logic control circuit 512 is a simplified version of the logic circuit 112 and operates on the basis of the signals P, T and L. For example, it is similar to that shown in FIG. 3, but is limited to the elements 311 to 314 and 316 to 318. The sub-carrier F is supplied by elements outside the arrangement and arrives directly at the gate 120. The luminance signal Y is directly applied to the summator 122. The element 50 combines the other elements of the arrangement which are the same as those shown in FIG. 1.

In many cases, transcoding has to be carried out from a composite video signal or even from a high frequency signal modulated by such a video signal. It is also occasionally necessary to obtain a high frequency signal modulated by the composite video signal emanating from this transcoding.

FIG. 6 shows one embodiment of such a transcoder which satisfies all these requirements and comprises a demodulator 61, a decoder 62, a transcoding module 63 and a modulator 64.

A high frequency signal HF$_1$ modulated by a composite video signal conforming to the SECAM standard is applied to the demodulator 61. By means of the demodulator 61, it is possible to extract from the signal HF$_1$ the composite signal V$_1$ which is then applied to the decoder 62. By means of this decoder, it is possible to extract from the signal V$_1$ the alternating chrominance and luminance signals C and Y, respectively. The demodulator 61 and the decoder 62 are similar to the same elements used in commercial television receivers.

The signals L and Y are then applied to the transcoding module 63 which is similar to that shown in FIG. 1. This module delivers a composite video signal V conforming to the NTSC standard. The signal V is applied to the modulator 64 in which it modulates a carrier generated in this example inside the modulator. The result of this modulation is a modulated high frequency signal HF$_2$ which may then be applied, for example, to an ordinary television receiver which is only able to receive high frequency transmissions in accordance with the NTSC standard.

An apparatus such as this thus forms an autonomous assembly which transcodes a high frequency signal comprising chrominance signals of the SECAM type into another high frequency signal comprising chrominance signals of the NTSC type. Naturally, the analysis raster remains the same.

What I claim is:

1. A colour television transcoder for transcoding an input signal comprising a first sequence of a first and a second chrominance signals having respectively a first and a second fixed amplitude, a common duration and alternating at a line frequency, into an output signal comprising a sub-carrier modulated by simultaneously said two chrominance signals, said transcoder comprising:
   equalising means receiving said input signal for bringing the amplitude/frequency curves of said chrominance signals to one and the same contour, delivering a first and a second equalized chrominance signals;
   means for generating a second sequence of a first and a second sub-carriers alternating at said line frequency and synchronously with said first sequence; said first and second sub-carriers having respectively a third and a fourth fixed amplitude and a fixed common frequency, and the second sub-carrier being in quadrature with the first sub-carrier;
   means for setting the ratio of said first fixed amplitude to said third fixed amplitude at a first value, and for setting the ratio of said second fixed amplitude to said fourth fixed amplitude at a second value;
   a single balanced modulator receiving said first and second sequence for modulating respectively said first and second sub-carriers with said first and second equalized chrominance signals, delivering a modulated signal;
   means for delaying said modulated signal by said duration, delivering a delayed signal;
   adding means for adding said modulated signal and said delayed signal, delivering said output signal; and
   control means for extracting from said first sequence a chrominance synchronisation signal and for combining said chrominance synchronisation signal with an external line synchronisation signal and an external field synchronisation signal for emitting a switch signal for controlling the alternance of said first and second sub-carriers and the setting of said first and second value of said ratios.

2. A transcoder as claimed in claim 1, further comprising calibrating means for delivering under the control of said control means to said adding means bursts of one of said sub-carriers, said bursts having a fixed phase in relation with said one of sub-carriers, a fifth fixed amplitude in relation with said modulated signal, and taking place in time at the beginning of each of said first and second chrominance signals.

3. A transcoder as claimed in claim 2, further comprising means for switching off under the control of said control means said first and second equalized chrominance signals from said modulator during the delivering of said bursts.

4. A transcoder as claimed in claim 3, wherein said generation means are fed with an external signal of said same sub-carrier frequency.

5. A transcoder as claimed in claim 3, wherein said adding means are fed with a luminance signal, said output signal being a full colour video signal.

6. A transcoder as claimed in claim 5, further comprising means for extracting from said luminance signal said line synchronisation signal and said field synchronisation signal and providing said line and field synchronisation signals to said control means.

7. A transcoder as claimed in claim 6, further comprising means for demodulating and decoding an incoming high-frequency colour television signal, delivering said chrominance signals and said luminance signal.

8. A transcoder as claimed in claim 7, further comprising means for modulating by said output signal a high frequency carrier, delivering an output high-frequency colour television signal.

9. A transcoder as claimed in claim 6, further comprising means for modulating by said output signal a high-frequency carrier, delivering an output high-frequency colour television signal.

10. A transcoder as claimed in claim 6, wherein said setting means comprise means for calibrating said third and fourth fixed amplitude under the control of said switch signal.

11. A transcoder as claimed in claim 10, wherein said chrominance signals and said luminance signal are SECAM signals and said output signal is a NTSC signal.

12. A transcoder as claimed in claim 6, wherein said setting means comprise means for calibrating said first and second fixed amplitude under the control of said switch signal.

13. A transcoder as claimed in claim 12, wherein said chrominance signals and said luminance signal are SECAM signals and said output signal is an NTSC signal.

* * * * *